(12) United States Patent
Park (10) Patent No.: US 11,763,671 B2
(45) Date of Patent: Sep. 19, 2023

(54) STOPPER-TYPE CHARGING DEVICE AND DRIVING METHOD THEREOF

(71) Applicant: DURUSCO. EV Inc., Goyang-si (KR)

(72) Inventor: Jong Soo Park, Goyang-si (KR)

(73) Assignee: DURUSCO. EV Inc, Goyang-si (KR)

( * ) Notice: Subject to any disclaimer, the term of this patent is extended or adjusted under 35 U.S.C. 154(b) by 0 days.

(21) Appl. No.: 17/964,915

(22) Filed: Oct. 13, 2022

(65) Prior Publication Data

US 2023/0177957 A1     Jun. 8, 2023

(30) Foreign Application Priority Data

Dec. 7, 2021   (KR) .................... 10-2021-0174109

(51) Int. Cl.
| | |
|---|---|
| *H02J 7/00* | (2006.01) |
| *G08G 1/14* | (2006.01) |
| *B60L 53/60* | (2019.01) |
| *G08B 17/00* | (2006.01) |
| *F21S 8/00* | (2006.01) |
| *F21Y 115/10* | (2016.01) |

(52) U.S. Cl.
CPC ............... *G08G 1/14* (2013.01); *B60L 53/60* (2019.02); *F21S 8/032* (2013.01); *G08B 17/00* (2013.01); *H02J 7/0042* (2013.01); *H02J 7/0047* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2002/0163428 | A1* | 11/2002 | Weng ..................... | G08B 7/066 |
| | | | | 340/508 |
| 2005/0096974 | A1* | 5/2005 | Chagoly .................. | G08G 1/14 |
| | | | | 705/13 |
| 2011/0313893 | A1* | 12/2011 | Weik, III ........... | G06Q 30/0645 |
| | | | | 705/28 |
| 2020/0290623 | A1* | 9/2020 | Ogura ................... | G06V 10/143 |
| 2022/0044023 | A1* | 2/2022 | Xue ....................... | G06V 20/52 |

FOREIGN PATENT DOCUMENTS

| | | |
|---|---|---|
| KR | 10-1056632 B1 | 8/2011 |
| KR | 10-1062989 B1 | 9/2011 |
| KR | 10-1212205 B1 | 12/2012 |
| KR | 10-1220809 B1 | 1/2013 |
| KR | 10-2070259 B1 | 1/2020 |
| KR | 10-2332854 B1 | 12/2021 |

* cited by examiner

*Primary Examiner* — Arun C Williams
(74) *Attorney, Agent, or Firm* — Revolution IP, PLLC (57) ABSTRACT

The present invention relates to a stopper-type charging device and a driving method thereof, wherein the stopper-type charging device includes an emergency bell unit that is provided on a main body part of a stopper for a vehicle installed on a floor of a parking lot and operates to prevent crime in a surveillance blind spot in the parking lot, a light emitting unit that guides a vehicle parked in the parking lot to be parked in a parking section for charging, and operates as a flash to illuminate a periphery of the vehicle, and a sensor unit that detects a fire by detecting a flame of the vehicle being charged.

7 Claims, 4 Drawing Sheets

STOPPER-TYPE CHARGING DEVICE AND DRIVING METHOD THEREOF

CROSS-REFERENCE TO RELATED APPLICATION

This application claims priority under 35 U.S.C. § 119(a) to Korean Patent Application No. 10-2021-0174109 filed on Dec. 7, 2021, the disclosure of which is incorporated herein by reference in its entirety.

BACKGROUND OF THE INVENTION

(a) Technical Field

The present invention relates to a stopper-type charging device and a method of driving the same, and more particularly, to a stopper-type charging device, such as an electric vehicle charging stopper, capable of detecting charging of an electric vehicle and a parked electric vehicle in a parking lot, facilitating a detection of fire of an electric vehicle and a prevention of crime in a parking lot with a flame detection sensor and an emergency bell interlock switch that are installed on a car stopper, and guiding safe parking of a vehicle with a dedicated display light emitting diode (LED) for an electric vehicle charging compartment, and a deriving method thereof.

(b) Background Art

In general, electric vehicles are driven by using electricity as an energy source. The electric vehicles do not emit exhaust gas at all, and thus, the frequency of use of the electric vehicles is gradually increasing. In accordance with policies of each country to reduce environmental pollution, the use of electric vehicles is being encouraged. Despite these advantages, the reason why the penetration rate of electric vehicles is low is that the electric vehicles may not be conveniently charged with electricity which is an energy source of the electric vehicles.

Meanwhile, although electric vehicles are expanding worldwide due to the recent changes in the global environment and chargers for electric vehicles is being installed, the penetration rate of the chargers for electric vehicles is not keeping up with the growth rate of electric vehicles, and therefore, infrastructure problems are in a serious situation. Due to the lack of infrastructure, disputes between owners of electric vehicles are also frequently occurring.

Conventionally, in order for a driver to charge batteries with electricity after using an electric vehicle, since the driver has to draw a long wire out of the house and connect the wire to a car charging unit installed on the electric vehicle to charge the electric vehicle, it is very inconvenient to charge the electric vehicle and cumbersome to use the electric vehicle.

In addition, a major obstacle to the spread of the existing slow charger is the acceptance of residents. Residents agree on the need to increase the spread of electric vehicles, but they are stingy about installing chargers for electric vehicles in parking lots, such as their apartments. The prevailing perception among residents is that chargers take up parking spaces for internal combustion engine vehicles due to their volume.

[Prior Art Documents]
[Patent Documents]
Korean Patent No. 10-1056632 (Aug. 08, 2011)
Korean Patent No. 10-1062989 (Aug.31, 2011)
Korean Patent No. 10-1212205 (Dec. 07, 2012)
Korean Patent No. 10-1220809 (Jan. 03, 2013)
Korean Patent No. 10-2332854 (Nov. 25, 2021)

SUMMARY OF THE INVENTION

It is an object of the present invention to provide a stopper-type charging device, such as an electric vehicle charging stopper, capable of detecting charging of an electric vehicle and a parked electric vehicle in a parking lot, facilitating a detection of fire of an electric vehicle and a prevention of crime in a parking lot with a flame detection sensor and an emergency bell interlock switch that are installed on a car stopper, and guiding safe parking of a vehicle with a dedicated display light emitting diode (LED) for an electric vehicle charging compartment, and a deriving method thereof.

According to an aspect of the present invention, a stopper-type charging device may include: an emergency bell unit that is provided on a main body part of a stopper for a vehicle installed on a floor of a parking lot and operates to prevent crime in a surveillance blind spot in the parking lot; a light emitting unit that guides a vehicle parked in the parking lot to be parked in a parking section for charging, and operates as a flash to illuminate a periphery of the vehicle; and a sensor unit that detects a fire by detecting a flame of the vehicle being charged.

The main body part may be made of aluminum (AL), stainless steel, steel, or urethane to have durability against an impact applied by a wheel of the vehicle.

The light emitting unit includes: a guide light unit that guides the vehicle into the parking section by illuminating a parking floor of the parking section when the vehicle is parked; and a flash unit that illuminates the periphery of the vehicle to assist charging when the parking of the vehicle is completed.

The guide light unit may include an LED element configured at least one of both ends of the main body part.

The light emitting unit may illuminate the parking floor of the parking section to guide the vehicle into the parking section when the vehicle is parked, and change an irradiation angle of irradiated light when the parking of the vehicle is completed to operate as the flash.

The light emitting unit may provide condensed light when the vehicle is guided, and provide diffused light when the flash is operated.

According to another aspect of the present invention, a method of driving a stopper-type charging device includes: preventing, by an emergency bell unit provided on a main body part of a stopper for a vehicle installed on a floor of a parking lot, crime in a surveillance blind spot in the parking lot; guiding, by a light emitting unit provided on the main body part, the vehicle parked in the parking lot for charging to be parked in a parking section and operating as a flash to illuminate the periphery of the vehicle; and detecting, by a sensor unit provided on the main body part, a fire by detecting a flame of the vehicle being charged.

According to an embodiment of the present invention, it is possible to easily replace a charger at the existing place where the stopper was installed and reduce damage to a fire of an electric vehicle and prevent crime in a CCTV blind spot or the like by installing a flame detection function and an emergency bell interlocking stopper charge in the existing place.

In addition, according to an embodiment of the present invention, since an outlet-type stopper charger with a smart charging function is installed in multiple parking spaces and may be used together with parking spaces of internal combustion engine vehicles, normal slow charging may be done from after work in the evening to before going to work the next morning according to the user's lifestyle.

DETAILED DESCRIPTION OF THE EMBODIMENTS

Hereinafter, embodiments of the present disclosure will be described in detail with reference to the accompanying drawings.

Figure 1A:
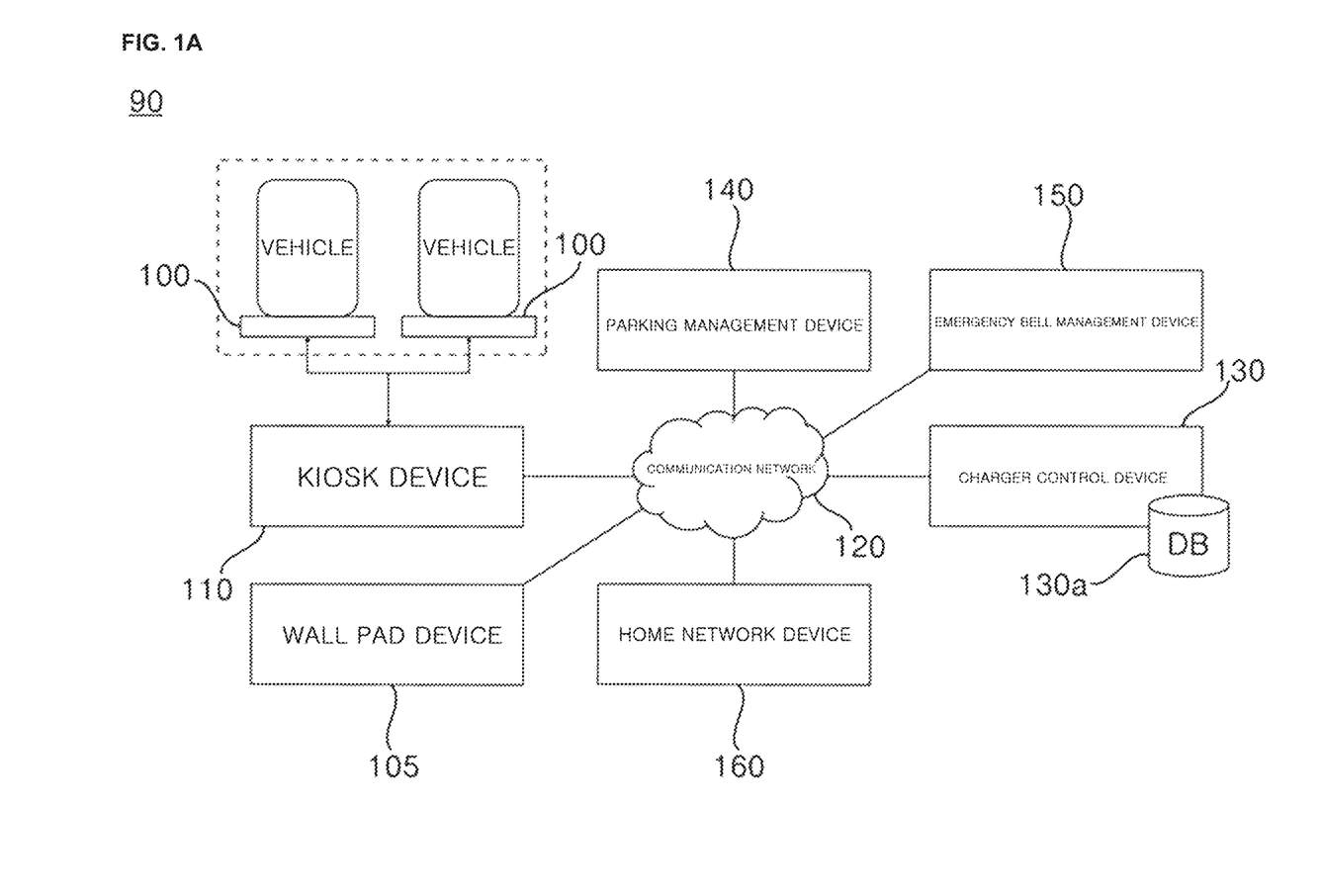
FIG. 1A is a diagram illustrating a stopper filling system according to an embodiment of the present invention.
Figure 1B:
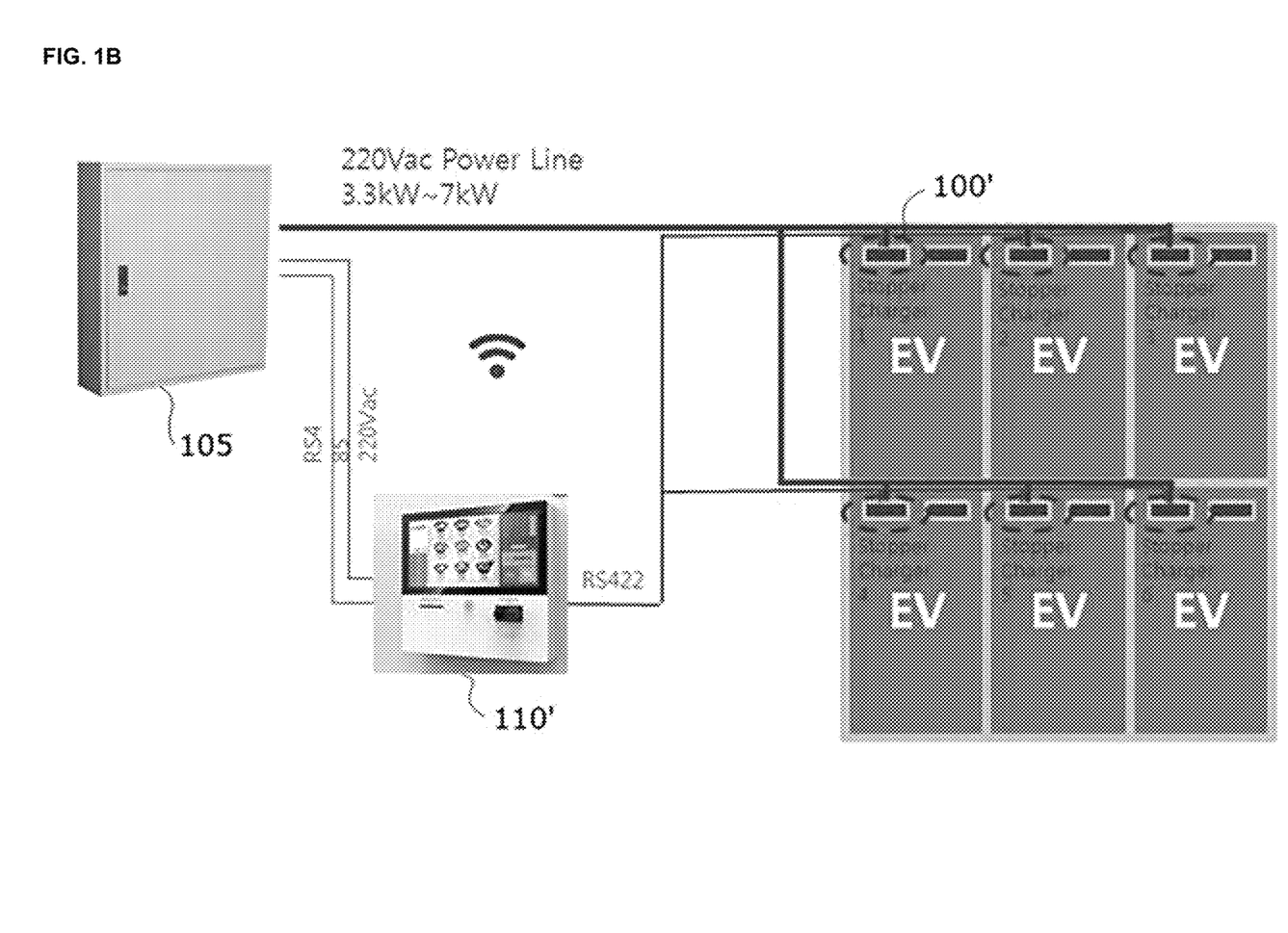
FIG. 1B is a diagram illustrating an electric shock-free stopper charging system according to another embodiment of the present invention.

1A is a diagram illustrating a stopper filling system according to an embodiment of the present invention, and FIG. 1B is a diagram illustrating an electric shock-free stopper filling system according to another embodiment of the present invention.

As illustrated in FIG. 1A, a stopper filling system 90 according to an embodiment of the present invention includes part or all of a stopper-type charging device 100, a wall pad device 105, a kiosk device 110, a communication network 120, a charger control device 130, a parking management device 140, an emergency bell management device 150, and a home network device 160.

Here, "including part or all" means that some components such as the wall pad device 105 or the parking management device 140 are omitted to configure the stopper filling system 90 or the charger control device 130 is installed, or some or all of the components constituting the communication network 120 may be integrated and configured in a network device (e.g., a wireless switching device, etc.) constituting the communication network 120, but is described as including all of the components in order to help a sufficient understanding of the invention.

The stopper-type charging device 100 is installed in a stopper such as a parking lot of an apartment house or apartment. The stopper is a structure that prevents a vehicle from leaving a parking area by braking movement when a vehicle is reversing. Of course, the stopper-type charging device 100 according to the embodiment of the present invention may be installed inside the stopper made of an existing material such as rubber, but since the stopper itself can be formed or configured as a single stopper-type charging device 100, the embodiment of the present invention will not be particularly limited to any one form.

The stopper-type charging device 100 according to the embodiment of the present invention may form a main body part constituting an external frame in the form of a connector or an outlet, and a circuit unit may be formed inside the main body part through a separate device. The main body part is formed of materials such as aluminum, stainless steel, steel, and urethane in order to have excellent durability against an impact applied from wheels of the vehicle. In addition, the circuit unit may be viewed as a driving device for selectively controlling power, voltage, or the like supplied to a vehicle such as an electric vehicle through a connector by configuring a CPU or MPU on a PCB substrate. The corresponding driving device may communicate with the kiosk device 110 or the like illustrated in FIG. 1.

In addition, the stopper-type charging device 100 is used as a charger for fire and user safety of an electric vehicle using a car stopper. The stopper-type charging device 100 may be easily used to detect charging of an electric vehicle and a parked electric vehicle in a parking lot, and detect a fire of an electric vehicle and prevent crime in a parking lot with a flame detection sensor and an emergency bell interlock switch that are installed in the stopper-type charging device. In addition, safe parking of a vehicle is guided by a dedicated display LED for an electric vehicle charging compartment installed in the stopper-type charging device 100.

More specifically, the stopper-type charging device 100 serves to safely charge an electric vehicle with flame detection, moisture-proof detection, and water leakage detection functions built into the stopper, and an emergency bell switch installed on the stopper to prevent fire and crime from a CCTV blind spot in a parking lot. In addition, the stopper-type charging device 100 has a smart charging function that may control a charger set for each compartment with one kiosk monitor. When 42 kW was required when the existing six slow chargers are installed, the stopper-type charging device 100 capable of detecting a flame may only need half of that. By the smart power distribution function, it is possible to control charging power according to the number of times of charging of an electric vehicle from 3 kw to 7 kw and reduce communication costs and a basic fee of charger. The smart charging can be efficiently made when there are only a charging control program that distributes power on a first-come, first-served basis in a much smaller capacity than the existing contract power, and one fourth of the expected power.

For example, the stopper-type charging device 100 is capable of smart power distribution according to the number of times of charging of an electric vehicle, and a wired mode and 1: N wireless communication mode. To this end, the wired mode may include a power distributor that may be controlled by the kiosk device 110. For example, the stopper-type charging devices 100 respectively installed in a plurality of stoppers may operate in parallel with each other based on a voltage supply source. Each stopper may be switch-controlled through a distributor or the like. Accordingly, when there is a charge request of vehicle No. 1, power is supplied to line No. 1, and in the process, when there is a request for charging of vehicle No. 2, a power supply circuit operates so that power is also supplied to line No. 2. The stopper may be driven in parallel by a distributor or the like. The stopper-type charging device 100 capable of smart charging that does not exceed contract power during maximum simultaneous charging can cut off overvoltage and overcurrent. It is possible to measure and determine a sensed value through voltage or current sensing. The stopper-type charging device 100 may have a built-in 3 to 50 KW charging-type charger exclusive outlet. With the central kiosk control method, the stopper-type charging device 100 may operate as an electric vehicle charger using a screen capable of identifying an RF reader, a credit card, QR payment, and a parking location.

The stopper-type charging device 100 according to the embodiment of the present invention is a product that charges an electric vehicle by using an outlet for 220V and an exclusive in-wrap for an electric vehicle. In a simple form of attaching a product to a general outlet, user authentication, electric vehicle charging, power metering, transmission of electricity consumption, and the like are possible in the kiosk device 110 based on the Internet of Things (IoT). In addition, the stopper-type charging device 100 may greatly expand the electric vehicle charging infrastructure. The stopper-type charging device 100 may operate as a stopper-type electric vehicle charger with a built-in charging-type outlet for charging and controlling an electric vehicle by communication through Bluetooth tethering with a user terminal device such as a smartphone.

Above all, according to the stopper-type charging device 100 according to the embodiment of the present invention, without a cumbersome task of marking the existing electric car parking lot with paint, an LED indicator built into the stopper-type charging device 100 illuminates a floor of a parking surface to check an electric vehicle-only compartment, and illuminates a dark area during charging so that a user may easily perform parking and charging. For example, the stopper-type charging device 100 includes, for example, LED light emitting devices at both ends. In this case, as the light emitting device, a type of device using condensed light instead of diffused light may be used. For example, by providing a condensing lens inside the light emitting device, light is irradiated in the form of forming a line on the parking floor surface to form a parking section. Accordingly, a vehicle is accurately parked in the parking section using the corresponding light during parking. Of course, the stopper-type charging device 100 operates an LED light emitting unit after recognizing that a vehicle is parked in a specific parking area through a sensor configured therein to irradiate light to the parking section. This operation method may operate the LED light emitting unit in the form that the LED light emitting unit operates when a vehicle is detected and tracked by an access blocking device or the like installed at an entrance of a parking lot or a location of a user terminal device carried by a user of the vehicle is tracked, but will not be particularly limited to any one form.

The stopper-type charging device 100 according to the embodiment of the present invention may have a slightly different configuration of the light emitting unit depending on how it is installed in a parking section. For example, when the long stopper-type charging device 100 is installed on one side of a parking section as in FIG. 1, the light emitting unit may be provided on both sides, but when one or two short stopper-type charging devices 100 are installed in one parking section, a light emitting unit may be provided on one side and operate. Therefore, in the light emitting unit according to the embodiment of the present invention, in other words, the configuration of the light emitting unit operating as parking guidance and flash may be changed depending on how the stopper-type charging device 100 is installed. Therefore, the embodiment of the present invention will not be particularly limited to the above description.

When a charging vehicle wants to park in a specific parking area, the stopper-type charging device 100 according to the embodiment of the present invention may guide a vehicle to a parking section and detect that parking is completed after the vehicle is completely parked, and operate the LED as the flash. The light emitting unit may operate as the flash, and illuminates dark areas during charging of a vehicle so that a user may perform parking and charging easily. For example, the stopper-type charging device 100 constitutes a first light emitting unit, that is, a guide light unit operating when guiding a vehicle to a parking area, and a second light emitting unit, that is, a flash unit operating as a flash, respectively, and may track an operation of a vehicle, etc., to operate the second light emitting unit after operating the first light emitting unit. In this case, the first light emitting unit includes an LED element that condenses and irradiates light using a condensing lens or the like, whereas the second light emitting unit may use an LED element including a diffusion plate in a form that diffuses light in order to operate as a flash. Of course, the first light emitting unit is not particularly limited thereto.

In addition, the light emitting unit provided in the stopper-type charging device 100 according to the embodiment of the present invention may be configured in various forms. For example, one light emitting unit in which the first light emitting unit and the second light emitting unit are integrated may be configured. For example, it is representative to adjust an irradiation angle of light emitted from the LED light emitting device. When a vehicle is guided to be parked, light is irradiated in one direction, and when parking is completed, the light irradiation angle of the LED light emitting device is adjusted to, for example, 90° to illuminate a ceiling of a parking lot, not a floor surface, and is adjusted to be within 90°. As described above, the light emitting unit of the stopper-type charging device 100 according to the embodiment of the present invention may be configured in various forms, and therefore, will not be particularly limited to any one form.

Furthermore, the stopper-type charging device 100 according to the embodiment of the present invention is configured to include an emergency bell unit and a sensing unit. In the case of the emergency bell unit, the stopper-type charging device 100 including an emergency bell unit may be installed and operate in a parking area where a surveillance blind spot is formed by CCTV or the like in a parking lot. Through this, it is possible to perform a crime prevention operation in the blind spot. The emergency bell unit may be configured to transmit an alarm to the outside, but when a user selects an emergency bell from the emergency bell unit, an emergency signal is transmitted to the charger control device 130 of FIG. 1, and thus, appropriate actions may be taken. For example, a control personnel of the charger control device 130 may take appropriate actions through monitoring.

The stopper-type charging device 100 according to the embodiment of the present invention includes a flame detection sensor for flame detection, a water leakage detection sensor for water leakage detection, and a moisture-proof detection sensor for moisture-proof detection to configure the sensor unit. The stopper-type charging device 100 may have functions such as rated 30 to 60 A, smart charging 3 to 60 A, power and leakage current abnormal detection control, waterproofing, and moisture-proofing. In other words, the stopper-type charging device 100 may be provided with a sensing unit for detecting a leakage current or a water leakage sensor for detecting water leakage, etc., thereby detecting an abnormal operation of the stopper-type charging device 100. For example, when a user requests to charge a vehicle in a location where he/she parks through the kiosk device 110 or the user terminal device, the user may start charging after performing a detection operation, such as abnormality or water leakage, at the initial stage of operation. Of course, it is possible to detect whether there is water leakage or the like even during charging, and stop charging when a leak or an abnormal operation is detected. Therefore, it can be seen that the stopper-type charging device 100 selectively operates according to various situations such as abnormal operation or water leakage.

The flame detection sensor is a sensor that receives an analog or digital signal by detecting an infrared wavelength (760 nm to 110 nm) which is heat radiation derived from a flame that is burned through an infrared LED when a fire occurs. Accordingly, the stopper-type charging device 100 may detect a flame during charging the vehicle through the flame detection sensor, determine whether a fire occurs based on the detection signal, and generate a fire alarm based on the determination result. To this end, a detection signal is transmitted to the charger control device 130 of FIG. 1, and thus, appropriate actions are taken. Alternatively, when the stopper-type charging device 100 is provided with an audio output unit, an alarm sound may be generated through the corresponding voice output unit.

The wall pad device 105 is a device provided in each home, and is a home management terminal that has functions such as access control, lighting and home appliance control, and fire monitoring in the form of being attached to a wall of a kitchen or a living room of a home. The wall pad device 105 according to the embodiment of the present invention may receive information such as a charging state or a charge of a vehicle transmitted from the home network device 160 or the like of FIG. 1. Of course, in addition to the wall pad device 105, since a user terminal device of a vehicle owner can receive information such as the charging state or charge of the vehicle, the embodiment of the present invention will not be limited to any one form. For example, by transmitting the charging amount, the charging fee, and the charging completion state of the stopper-type charging device 100 to the wall pad device 105 installed in an apartment house, a subscriber pays from a management fee or pays by credit card. Alternatively, for example, after applying for automatic debit, information on payment details may be provided to the wall pad device 105.

The kiosk device 110 operates by connecting to a plurality of stopper-type charging devices 100 provided in a parking lot. The kiosk device communicates with a plurality of stopper-type charging devices 100 through a power line or Ethernet. Here, the power line communication (PLC) is a technology for transmitting voice, text data, images, etc. using a power line that supplies electricity to the stopper-type charging device 100. When only an electric plug is plugged in without a phone line, it may be used in a variety of ways from high-speed Internet communication to Internet phone (VoIP), home networking, and remote meter reading. The kiosk device 110 processes an emergency signal from an emergency bell unit or various types of sensing signals provided from a sensor unit configured in the stopper-type charging device 100 by the power line communication as described above.

The kiosk device 110 controls an operation of the stopper-type charging devices 100 each installed at a plurality of stoppers or as a stopper in a parking area. For example, when a user selects an area (e.g., side 1) in which he/she parked on a screen of the kiosk device 110 and requests to charge an electric vehicle, a charging operation may start by checking whether a connector of an electric vehicle is connected, etc. In addition, it is also possible to check whether payment has been made. In the case where service is used by a membership system, when member information is input on the screen, the charging operation starts after confirming whether payment has been made during charging such as making a deduction from the charged amount.

Alternatively, various operations may be additionally performed, such as recognizing a nearby user through identification information of an electric vehicle to which the connector is connected before the charging starts and requesting authentication from the user terminal device of the corresponding user. For example, the kiosk device 110 performs a tethering function to relay communication between the charger control device 130 and the user terminal device or the stopper-type charging device 100. Of course, on the contrary, since the user terminal device or the stopper-type charging device 100 may perform the tethering function, the embodiment of the present invention will not be particularly limited to any one form.

The communication network 120 includes both wired and wireless communication networks. For example, the wired/wireless Internet network may be used or linked as the communication network 120. Here, the wired network includes an Internet network such as a cable network or a public telephone network (PSTN), and the wireless communication network includes CDMA, WCDMA, GSM, evolved packet core (EPC), Long Term Evolution (LTE), a Wibro network, and the like. Of course, the communication network 120 according to the embodiment of the present invention is not limited thereto, and may be used for, for example, a cloud computing network under a cloud computing environment, a 5G network, and the like as an access network of a next-generation mobile communication system to be implemented in the future. For example, when the communication network 120 is a wired communication network, an access point in the communication network 120 may connect to a switching center of a telephone office, etc., but in the case of a wireless communication network, may access SGSN or a gateway GPRS support node (GGSN) operating by a common carrier to process data or access various relay devices such as a base transceiver station (BTS), NodeB, and e-NodeB to process data.

The communication network 120 may include an access point. The access point includes a small base station, such as a femto or pico base station, which is mostly installed in a building. Here, the femto or pico base station is classified according to how many kiosk devices 110 or user terminal devices of a vehicle owner may be accessed in terms of classification of small base stations. Of course, the access point includes a short-range communication module for performing short-distance communication such as ZigBee and Wi-Fi with the kiosk device 110 or the user terminal device. The access point may use TCP/IP or real-time streaming protocol (RTSP) for wireless communication. Here, the short-distance communication may be performed in various standards such as radio frequency (RF) such as Bluetooth, Zigbee, infrared (IrDA), ultra high frequency (UHF), and very high frequency (VHF) and ultra-wideband communication (UWB), in addition to Wi-Fi. Accordingly, the access point may extract a location of a data packet, designate the best communication path for the extracted location, and transmit the data packet to the next device, for example, the charger control device 130 along the designated communication path. The access point may share several lines in a general network environment, and includes, for example, a router, a repeater, a relay device, and the like.

The charger management device 130 may manage the operation state of the plurality of stopper-type charging devices 100 installed in the parking lot, and, for example, may determine whether a crime has occurred by receiving the emergency bell signal. In addition, the charger management device 130 may not only perform an operation such as flame detection while charging the vehicle to receive a sensing signal for the operation, thereby performing a fire detection operation as but also perform various operations. For example, operations such as processing of fire and crime detection signals, A/S response, charging status, parking status control, etc., may be performed.

The charger management device 130 may include, for example, a server and may be linked to the DB 130a. For example, the stopper-type charging devices 100 installed in parking lots across the country may be integrated and managed. For example, when an app is installed on a user terminal device of a vehicle owner, various services according to an embodiment of the present invention may be provided through the app. When a user accesses the kiosk device 110 and requests to charge an electric vehicle, the kiosk device 110 may operate so that payment is made, and receives data after the charging is completed, and systematically classify, store, and manage the received data in the DB 130*a*. For example, when there is a charged amount of user A or there are points to be accumulated, this may be notified to the kiosk device 110 so that the charge amount may be deducted. Of course, the kiosk device 110 may provide various service screens on a screen by executing a program internally, but may also provide a service screen provided by the charger management device 130.

Typically, when a specific user, that is, an owner of an electric vehicle accesses the kiosk device 110, the charger management device 130 may provide analysis data of the user. Typically, when there are accumulated points, the notified points are notified. Alternatively, status information of a parking area requested by a user may be displayed on the screen. Alternatively, when vehicle management of an electric vehicle is required, information such as filter replacement may be provided. For example, the replacement may be encouraged by providing the date the filter was replaced. Although it is possible to provide such data to the user terminal device, it is preferable to provide the data on the screen of the kiosk device 110 unless specifically requested by the user terminal device.

For example, the kiosk device 110 may periodically check the operation state of the stopper-type charging device 100 in a section or an area under its control and provide related data to the charger management device 130. Accordingly, the charger management device 130 may notify the person concerned so that the repair of the specific stopper-type charging device 100 may be made according to a request from the corresponding kiosk device 110. Therefore, it can be seen that the charger management device 130 performs a monitoring operation.

In addition, since the charger management device 130 can collect big data related to users of electric vehicles, the big data may be analyzed by applying deep learning of artificial intelligence to further provide various additional services. For example, when there is a breakdown of an electric vehicle, information related to replacement of parts may be provided. Typically, when the replacement time for a rechargeable battery approaches, by providing information or advertisements to batteries replaced by other vehicle owners, it is possible to receive various additional services provided from the charger management device 130 by using the stopper-type charging device 100.

The parking management device 140 has a function that may perform settlement at once by interlocking a program linked to the kiosk device 110 that controls the stopper charging device 100 and the parking management server to solve the hassle of separately calculating the charging fee and the parking fee for the existing electric vehicle. In other words, the parking management device 140 manages parking of a vehicle parked in a parking lot of an apartment house, etc. For example, when a fee is charged according to a parking time, a parking fee is added by managing the parking of the vehicle, and in addition, the parking management device 140 may operate in order to add a charge for the amount of charge of the vehicle. The parking management device 140 may perform TCP/IP communication with the charger management device 130.

The emergency bell management device 150 manages emergency bells provided in a plurality of stopper-type electric devices 100 installed in a parking lot. For example, when the emergency bell of the stopper-type charging device 100 is selected by a user, the corresponding signal is provided to the emergency bell management device 150, and the emergency bell management device 150 may operate in the form of expressing an event or an accident with the interlocking charger control device 130. Also, the emergency bell management device 150 may periodically check the operation state of the emergency bell and provide the check result to the charger control device 130. For example, a control unit such as a CPU, a MPU, or a GPU provided inside the stopper-type charging device 100 may periodically check the operation state by providing an electric signal to an emergency bell unit or performing a communication operation, and provide the check signal to the emergency bell management device 150. The emergency bell management device 150 may perform Ethernet communication with the charger management device 130.

The home network device 160 is, for example, a server, and may manage the wall pad device 105 installed in the home and interlock with the wall pad device 105. When a vehicle owner performs charging using the stopper-type charging device 100 of a parking lot, the home network device 160 may receive information related thereto, that is, data from the kiosk device 110, and store and manage the information. Of course, the home network device 160 may manage data such as charging or parking fee payment, and may provide the related data to the user terminal device such as the wall pad device 105 or a smart phone of each home. The home network device 160 and the kiosk device 110 may perform wireless communication.

The outlet-type stopper charger to which the smart charging function according to the embodiment of the present invention is installed in multiple parking spaces and may be used together with internal combustion engine vehicle parking spaces, so the outlet-type stopper charger also has a disadvantage in that it takes a long time to solve the bottleneck of charging an electric vehicle, but may perform normal slow charging from after work in the evening to before going to work the next morning according to the user's lifestyle. It is also possible to solve the problem of the acceptance of residents which is a big obstacle that prevents the spread of the existing slow charger. Residents agree on the need to increase the spread of electric vehicles, but they are stingy about installing chargers for electric vehicles in parking lots of their apartments. This is because residents believe that chargers take up parking spaces for internal combustion engine vehicles due to their volume. In order to solve the problem, it is possible to reduce damage to a fire of an electric vehicle and prevent crime in a blind spot of CCTV or the like by installing the flame detection function and the emergency bell interlocking stopper charger as a charger at the existing place where the stopper was installed.

In the embodiments of the present invention so far, for convenience of explanation, although the example in which the stopper filling system 90 is the form of the server and is configured by being divided into a charger control device 130, the parking management device 140, the emergency bell management device 150, and the home network device 160 is exemplified, the parking management device 140, the emergency bell management device 150, the home network device 160, and the like may be configured in, for example, the form that they are integrated into the charger control device 130, and therefore, the embodiment of the present invention will not be particularly limited to any one form.

Meanwhile, as illustrated in FIG. 1B, an electric shock-free smart stopper charger 100' may be used. For the user's electrical safety, for additional protection of an earth leakage circuit breaker in a charging unit, it is an electric shock-free electric panel 105 that detects and restores flooding, electric leakage, disconnection, poor connection, insulation deterioration, and the like in real time, in which leakage current is limited to 5 mA or less to protect human life from electricity. Except for these contents, since the electric shock-free smart stopper filling system of FIG. 1B is not significantly different from the stopper filling system 90 of FIG. 1A, the detailed contents thereof will be replaced with those contents.

Figure 2:
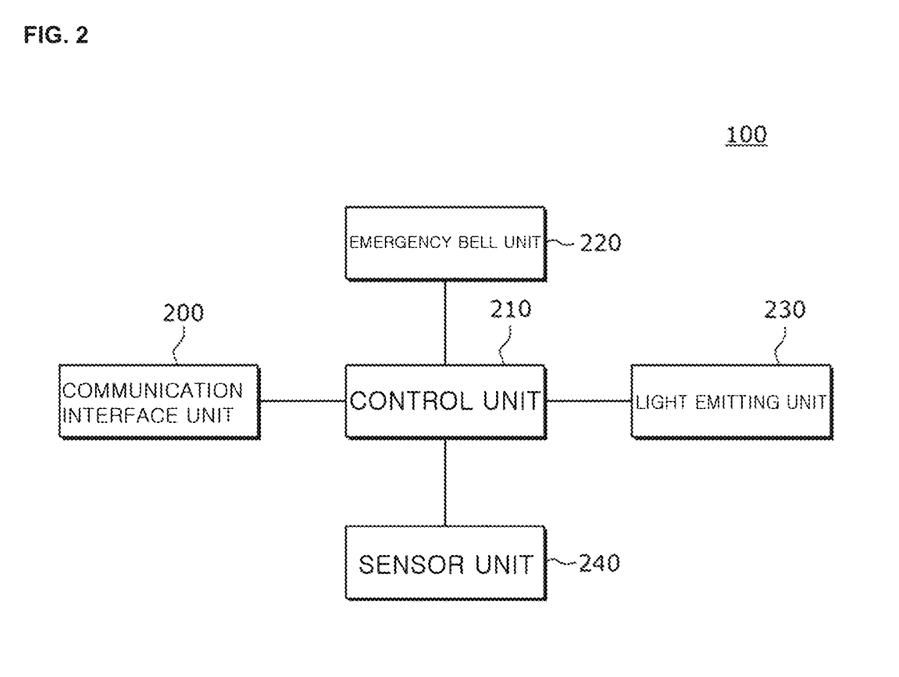
FIG. 2 is a block diagram illustrating a detailed structure of a stopper charging device of FIG. 1.

FIG. 2 is a block diagram illustrating a detailed structure of the stopper charging device of FIG. 1.

As illustrated in FIG. 2, the stopper charging device 100 according to the embodiment of the present invention includes some or all of a communication interface unit 200, a control unit 210, an emergency bell unit 220, a light emitting unit 230, and a sensor unit 240, and may further include a power supply unit or an audio output unit, a storage unit (e.g., memory), and the like.

Here, "including some or all" means that some components such as a storage unit are omitted so that the stopper charging device 100 is configured, some components such as the light emitting unit 230 may be configured by being integrated with other components such as the control unit 210, or the like, and is described as including all of the components in order to help a sufficient understanding of the invention.

The power supply unit selectively supplies power under the control of the control unit 210. In other words, the power supply unit may perform a power supply operation when payment of a fee, etc. is completed according to the request of the kiosk device 110 of FIG. 1. Alternatively, when an abnormal operation such as detecting water leakage in the stopper-type charging device 100 through the sensor unit 240 is detected, the power supply unit may fundamentally cut off the supply of power under the control of the control unit 210, and may stop power that are being supplied. In the case of a parking lot, rainwater or snow flows in winter through a vehicle, so an electric accident may occur on a floor surface. Alternatively, an electric shock or the like may be detected through a cable of the electric vehicle. Therefore, it can be seen that the stopper-type charging device 100 detects the cable state of the vehicle, the situation on the floor surface of the parking lot, or the like in real time or periodically.

The power supply unit is capable of smart power distribution according to the number of times of charging of an electric vehicle, and wired and 1:N wireless communication. To this end, the wired mode may include a power distributor that may be controlled by the control unit 210 but controlled by the kiosk device 110. For example, the stopper-type charging devices 100 respectively installed in a plurality of stoppers may operate in parallel with each other based on a voltage supply source. Each stopper may be switch-controlled through a distributor or the like. Accordingly, when there is a charge request of vehicle No. 1, power is supplied to line No. 1, and in the process, when there is a request for charging of vehicle No. 2, a power supply circuit operates so that power is also supplied to line No. 2. The stopper may be driven in parallel by a distributor or the like. The stopper-type charging device 100 capable of smart charging that does not exceed contract power during maximum simultaneous charging can cut off overvoltage and overcurrent. It is possible to measure and determine a sensed value through voltage or current sensing.

The communication interface unit 200 communicates with the kiosk device 110 or the communication network 120. The communication interface unit 200 performs power line communication or Ethernet communication with the kiosk device 110. Through the communication, the communication interface unit 200 may transmit a sensing signal such as flame detection, an emergency signal by an emergency bell operation, and the like to the kiosk device 110 or the communication network 120. Of course, the communication interface unit 200 may also transmit a sensing signal by a moisture proof sensor, a water leakage sensor, or the like.

In addition, the communication interface unit 200 receives the charging information or the like provided from the kiosk device 110 and transmits the received charging information to the control unit 210. For example, when the charging information is provided for electric charging, the control unit 210 may perform the power supply and cut-off operations based on the corresponding charging information.

The control unit 210 is in charge of overall control operations of the communication interface unit 200, the emergency bell unit 220, the light emitting unit 230, and the sensor unit 240 of FIG. 2. The control unit 210 controls the communication interface unit 200 to transmit the emergency signal of the emergency bell unit 220 and the sensing signal of the sensor unit 240 to the kiosk device 110. In addition, the control unit 210 may control the power supply unit based on the charging information provided from the kiosk device 110, or may perform a switching operation of a distributor or the like constituting the power supply unit.

Also, the control unit 210 controls the light emitting unit 230. For example, when the control unit 210 detects that a vehicle is parked in a parking section for charging through the sensor unit 240, the control unit 210 controls the LED light emitting device of the light emitting unit 230 to irradiate light from the LED light emitting device to guide the vehicle to the parking section. The light is irradiated to the floor surface of the parking section. In this case, the LED light may be irradiated to form a line by irradiating condensed light like a laser, but may simply emitted to be guided to the parking section so that a driver of a vehicle can see the corresponding LED through a side mirror.

In addition, the control unit 210 controls the light emitting unit 230 to operate as a flash based on the sensing signal of the sensor unit 240 when a vehicle is guided to a parking section for charging and is parked. For example, when the guide light unit and the flash are separately configured as described above, the guide light unit is blocked and at the same time the flash unit operates. However, when it is desired to simultaneously perform the operation of the guidance light and the flash with one LED light emitting unit, it may operate in the form of changing the irradiation direction of LED light. For example, a PCB board equipped with an LED light emitting device is connected to a drive shaft of a small motor, and a board rotates 90° according to the 90° rotation of the motor, so the flash unit may be operated in the form that the LED illuminates the ceiling of the parking lot while illuminating the parking floor surface.

The emergency bell unit 220 is provided with an emergency bell, and for example, the stopper-type charging device 100 may be installed when installed in a surveillance blind spot that is not monitored by CCTV or the like in a parking lot. In other words, the stopper-type charging device 100 may not configure the emergency bell unit 220 in the surveillance blind spot of the CCTV, but the emergency bell unit 220 may be configured to facilitate attachment and detachment when installed in the surveillance blind spot. For example, the components of the emergency bell part 220 are substantially configured, but may be in a state where only the emergency bell is absent. Accordingly, the emergency bell unit 220 may be used by a user, more precisely, by a user performing charging, in an emergency situation such as a crime or a fire. When the emergency bell of the emergency bell unit 220 is pressed, an alarm sound is generated from the audio output unit provided in the stopper-type charging device 100, or (or and) the emergency signal is transmitted to the charger control device 130 through the kiosk device 110 or the communication network 120, and thus, appropriate actions may be taken. For example, an alarm sound may be generated through a speaker installed in a parking lot, or emergency dispatch to a security room may be requested in the case of an apartment house.

The light emitting unit 230 includes LED light emitting devices provided at both ends of the stopper-type charging device 100, respectively, and may operate to irradiate light to the parking floor surface to form a line. This may be output in the form of condensing light by configuring the light emitting unit 230 as a laser element or by configuring a condensing lens in the light emitting device. In this way, a parking section may be guided to a driver of a vehicle parked in an arbitrary parking area to guide parking. In addition, the light emitting unit 230 may operate the flash unit to operate as a flash, that is, to illuminate the surroundings when the driver of the vehicle is charging. The flash unit may include an LED light emitting device, and is configured to irradiate light to the ceiling of the parking lot with respect to the floor surface. In this case, the LED light emitting device may irradiate diffused light. The diffused light may be diffused by providing a diffuser plate inside or outside the device.

As described above, the light emitting unit 230 may operate by separately configuring the guide light unit and the flash unit for guiding the vehicle to the parking section, but may also be configured in a form integrated with each other. For example, it has been described that the LED element rotates using a small motor to have a guidance function and a flash function, but since the related contents have been sufficiently explained above, they are replaced with those contents. Of course, the embodiment of the present invention will not be particularly limited to a method of using a small motor.

The sensor unit 240 includes various types of sensors such as a water leakage detection sensor for detecting water leakage, a moisture-proof sensor for detecting moisture-proof, or a humidity sensor, a flame detection sensor for detecting a flame when charging a vehicle, a motion detection sensor (e.g., photo sensor, or the like) for detecting movement of a vehicle, and a sound sensor (or microphone) that detects the completion of parking of the vehicle, that is, the sound of the vehicle's engine. The sensor unit 240 may operate under the control of the control unit 210, and provides a sensing signal to the control unit 210. For example, when a vehicle is guided by the guide light unit and parked in a parking section, the control unit 210 may determine that parking is completed through a sound sensor and operate the flash unit.

In addition to the above description, the communication interface unit 200, the control unit 210, the emergency bell unit 220, the light emitting unit 230, and the sensor unit 240 of FIG. 2 according to the embodiment of the present invention may perform various operations, and other detailed contents has been sufficiently described above, and therefore, will be replaced with those contents.

The communication interface unit 200, the control unit 210, the emergency bell unit 220, the light emitting unit 230, the sensor unit 240, the storage unit, and the like of FIG. 2 according to the embodiment of the present invention are configured in a hardware module physically separated from each other, but each module may store software for performing the above operation therein and may execute the software. However, since the software is a set of software modules, and each module can be formed of hardware, but will not be particularly limited to the configuration of software or hardware. For example, the storage unit may be a hardware storage or a memory. However, since it is possible to perform repository of information in the form of software, it will not be particularly limited to the above.

Meanwhile, as another embodiment of the present invention, the control unit 210 may include a CPU and a memory, and may be formed as a single chip. The CPU includes a control circuit, an arithmetic unit (ALU), an instruction interpretation unit, a registry, and the like, and the memory may include a RAM. The control circuit may perform a control operation, the arithmetic unit may perform an arithmetic operation of binary bit information, the instruction interpretation unit includes an interpreter, compiler or the like and may perform an operation of converting a high-level language into a machine language and a machine language into a high-level language, and the registry may be involved in software data storage. According to the above configuration, for example, at the beginning of the operation of the stopper-type charging device 100, a program stored in the sensor unit 240 or the kiosk device 110 is copied and loaded into memory, that is, a RAM, and then executed, so the data operation processing speed may be rapidly increased.

Figure 3:
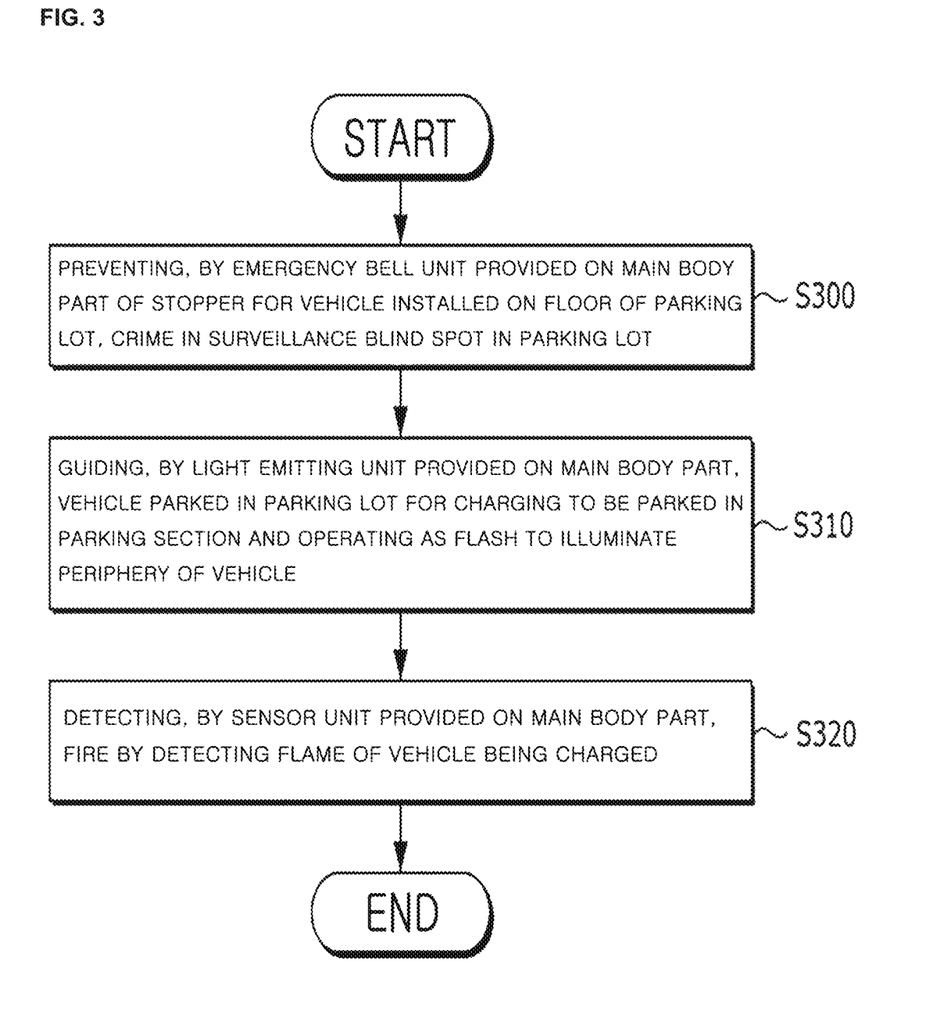
FIG. 3 is a flowchart illustrating a process of driving the stopper charging device of FIG. 1.

FIG. 3 is a flowchart illustrating a process of driving the stopper charging device of FIG. 1.

Referring to FIG. 3 together with FIG. 1 for convenience of explanation, the stopper charging device 100 according to the embodiment of the present invention operates an emergency bell unit provided on the main body part of a stopper for a vehicle installed on a floor of a parking lot for preventing a crime of a surveillance blind spot in a parking lot (S300).

In addition, in the stopper charging device 100, the light emitting unit provided in the main body part guides the vehicle parked in the parking lot for charging to be parked in the parking section, and operates as the flash to illuminate the surroundings of the vehicle (S310). For example, the light emitting unit may guide the vehicle to be parked in the parking section through the guide light of the guide light unit, and operate the flash unit, that is, a flash light or the like irradiating light to the ceiling of the parking lot or the like so that the vehicle owner can easily charge the vehicle.

Furthermore, the stopper charging device 100 detects, that is, determines a fire by detecting a flame being charged by the sensor unit provided in the main body part (S320). Of course, the flame sensor may perform the detection operation. For example, the sensor module, that is, the flame detection module constituting the sensor unit may generate and output the sensing signal in real time, but outputs the sensing signal only when the detection signal exceeds a reference value to perform the fire monitoring. The sensor for detecting the flame may start together when the flash unit operates.

Of course, the emergency bell unit, the light emitting unit, and the sensor unit are controlled by the control unit such as CPU, MPU, or GPU, and the control unit detects when the vehicle for charging enters the parking section in various routes (e.g. motion sensor detection, camera tracking, or smartphone tracking of a vehicle owner, sound detection of a vehicle, etc.) and operates the guide light unit of the light emitting unit, or may operate the flash unit and the flame sensor, respectively, when it is determined that parking is completed through a sound sensor or the like (e.g., when engine sound is off, etc.). Of course, when the charging operation is completed, the operations of the flash unit and the flame detection sensor may be terminated.

In addition to the above description, the stopper-type charging device 100 of FIG. 1 may perform various operations, and other detailed information has been sufficiently described above, and therefore, will be replaced with the contents.

Meanwhile, although the case in which all the components configuring an embodiment of the present invention are combined with each other as one component or are combined and operated with each other has been described, the present invention is not necessarily limited thereto. That is, all the components may also be selectively combined and operated with each other as one or more components without departing from the scope of the present disclosure. In addition, although each of all the components may be implemented by one independent hardware, some or all of the respective components which are selectively combined with each other may be implemented by a computer program having a program module performing some or all of functions combined with each other in one or plural hardware. Codes and code segments configuring the computer program may be easily inferred by those skilled in the art to which the present disclosure pertains. The computer program is stored in non-transitory computer readable media and is read and executed by a computer, thereby making it possible to implement an embodiment of the present invention.

Here, the non-transitory computer readable medium is not a medium that stores data therein for a while, such as a register, a cache, a memory, or the like, but means a medium that semi-permanently stores data therein and is readable by a device. In detail, the programs described above may be stored and provided in the non-transitory computer readable medium such as a CD, a digital versatile disk (DVD), a hard disk, a Blu-ray disk, a USB, a memory card, a ROM, or the like.

Although embodiments of the present invention have been illustrated and described, the present invention is not limited to the above-mentioned specific embodiment, but may be variously modified by those skilled in the art to which the present invention pertains without departing from the spirit and scope of the present invention as claimed in the claims. In addition, such modifications should also be understood to fall within the scope of the present invention.

What is claimed is:

1. A stopper-type charging device, comprising:
   an emergency bell unit that is provided on a main body part of a stopper for a vehicle installed on a floor of a parking lot and operates to prevent crime in a surveillance blind spot in the parking lot;
   a light emitting unit that guides a vehicle parked in the parking lot to be parked in a parking section for charging, and operates as a flash to illuminate a periphery of the vehicle; and
   a sensor unit that detects a fire by detecting a flame of the vehicle being charged.

2. The stopper-type charging device of claim 1, wherein the main body part is made of aluminum (AL), stainless steel, steel, or urethane to have durability against an impact applied by a wheel of the vehicle.

3. The stopper-type charging device of claim 1, wherein the light emitting unit comprises:
   a guide light unit that guides the vehicle into the parking section by illuminating a parking floor of the parking section when the vehicle is parked; and
   a flash unit that illuminates the periphery of the vehicle to assist charging when the parking of the vehicle is completed.

4. The stopper-type charging device of claim 3, wherein the guide light unit comprises an LED element configured at least one of both ends of the main body part.

5. The stopper-type charging device of claim 1, wherein the light emitting unit illuminates the parking floor of the parking section to guide the vehicle into the parking section when the vehicle is parked, and changes an irradiation angle of irradiated light when the parking of the vehicle is completed to operate as the flash.

6. The stopper-type charging device of claim 1, wherein the light emitting unit provides condensed light when the vehicle is guided, and provides diffused light when the flash is operated.

7. A method of driving a stopper-type charging device, comprising:
   preventing, by an emergency bell unit provided on a main body part of a stopper for a vehicle installed on a floor of a parking lot, crime in a surveillance blind spot in the parking lot;
   guiding, by a light emitting unit provided on the main body part, the vehicle parked in the parking lot for charging to be parked in a parking section and operating as a flash to illuminate the periphery of the vehicle; and
   detecting, by a sensor unit provided on the main body part, a fire by detecting a flame of the vehicle being charged.

* * * * *